June 24, 1930.  F. S. CARR  1,768,505

NUT AND SCREW FASTENING

Filed July 22, 1925

Inventor
Fred S. Carr,
by Emery Booth Janney Varney
Attys.

Patented June 24, 1930

1,768,505

UNITED STATES PATENT OFFICE

FRED S. CARR, OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

NUT AND SCREW FASTENING

Application filed July 22, 1925. Serial No. 45,276.

This invention aims to provide an improved nut and screw fastening installation.

In the drawings, which illustrate a preferred embodiment of my invention:—

Figure 1:
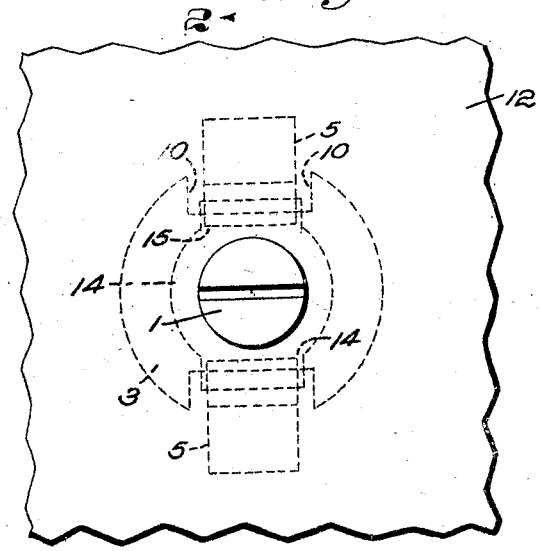
Figure 1 is an elevation view of the complete installation showing underlying parts in dotted lines.

Referring to the drawings, I have shown a shiftable nut fastening device for securing a plurality of parts together. The fastening device is particularly, though not exclusively, useful in securing fixtures to sheet metal supporting parts or for securing two sheet metal parts together as shown in the drawings.

The fastening device includes a screw 1 and a nut unit comprising a nut-holder 2 and a nut 3. The nut holder 2 is pressed from a single piece of metal to provide a base portion 4 and two resilient fingers 5, 5 extending from the base. These fingers extend at both sides of the base so as to provide relatively long fingers thereby to permit free expansion and contraction at the free end thereof. At their outer ends, the fingers are bent outwardly and inwardly to provide reversely bent hook portions 6.

The nut is provided with a base portion 7 and a shank portion 8. When assembled with the holder 2, the shank portion 8 protrudes through an aperture 9 in the base of the holder, the aperture being relatively larger in diameter than the shank, thereby permitting shifting movement of the nut relative to the holder. The base 7 of the nut is provided with notches 10 which receive the resilient fingers 5, 5 of the holder to prevent turning of the nut relative to the holder. These notches are relatively wider than the fingers, so that the nut may be oscillated relative to the holder. The fingers 5, 5 and the base 4 of the holder cooperate with the base portion 7 of the nut to hold both parts in assembled relation while permitting shifting of the nut relative to the holder in any transverse direction. The nut is also shiftable lengthwise of the holder to back-support the fingers 5, 5 and prevent contraction thereof.

The purpose of permitting the nut 3 to shift relative to the holder 2 is to provide for alignment of the nut with a screw when the fastening device is used for securing parts together which cannot be shifted relative to each other for alignment of the screw 1 with the nut 3. Thus I have provided simple and efficient means for correcting any misalignment of apertures formed in the sheet metal parts.

The parts to be secured together include an inner sheet metal part 11 and an outer part 12. The inner part 11 is provided with a depressed area 13 having an aperture 14 through the bottom thereof presenting notches 15, 15 for receiving the fingers 5, 5 of the nut-holder. The outer part 12 is provided with an aperture substantially in alignment with the aperture in the inner part 11.

In many instances, the back face of the inner part is inaccessible after the outer part has been placed against the inner part and therefore it is necessary to provide a nut which is held in position relative to the inner part while the outer part is being secured to the inner part.

Figure 4:
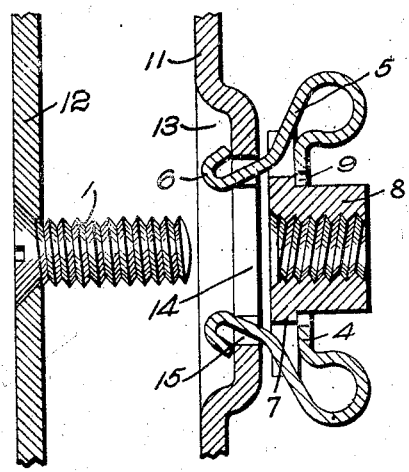
Fig. 4 is a section of the nut unit and support and a screw and support prior to securing the supports together.
Figure 5:
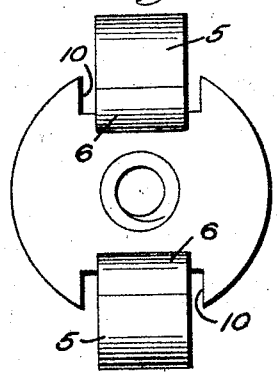
Fig. 5 is a front elevation of the nut unit.
Figure 6:
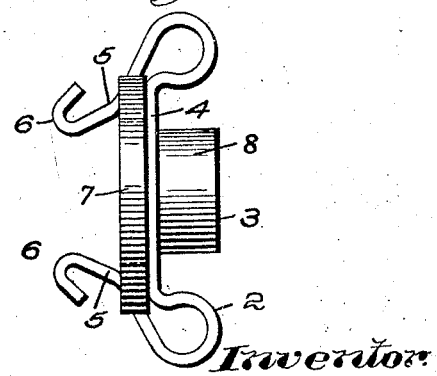
Fig. 6 is a side elevation of the nut unit.

The nut unit illustrated is particularly well adapted to be applied to metal framework, the inner face of which can be reached before the outer part is placed in position upon the framework. Thus the nut unit can be snapped into engagement with the part 11 from the inner or back face thereof. The fingers 5, 5 contract as they pass through the notches 15, 15 and expand after passing therethrough so that the reversely bent hook portions overlie and seat against the front face of the support 11 in the depressed area 13, as best illustrated in Fig. 4. The interlocking engagement of the fingers 5, 5 with the notches 15, 15 prevents relative turning movement of the nut unit relative to the inner support 11.

Figure 2:
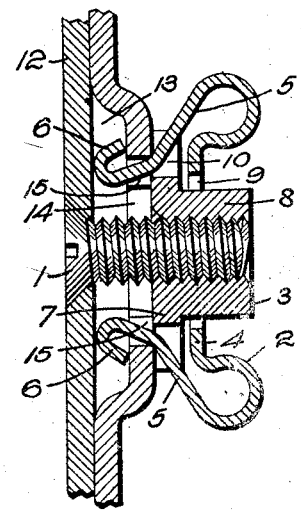
Fig. 2 is a section on the line 2—2 of Fig. 1.
Figure 3:
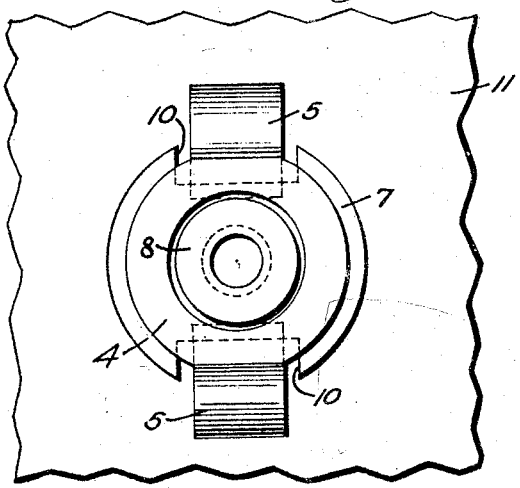
Fig. 3 is an elevation view showing the nut unit secured to its support.

The depressed area 13 provides a space into which the outer end portions of the fingers 5, 5 may project while permitting the outer part 12 to lie flush against the inner part 11, as illustrated in Fig. 2.

After the outer part 12 has been placed against the inner part 11, the screw 1 may be entered through the aperture in the outer part and engaged in the screw threaded hole in the nut 3. When the screw 1 is turned, it threads itself into the nut and at the same time the nut shifts into alignment with the screw 1. The screw may be turned until the base or flange portion 7 of the nut 3 is pulled tightly against the back face of the inner part 11, as shown in Fig. 2. Thus the base 7 of the nut will seat against the part 11 before the shank portion 8 of the nut can be withdrawn from the aperture in the holder, as best illustrated in Fig. 2. This arrangement prevents the nut from becoming disassembled from the nut-holder even though the nut may be tipped slightly in order properly to align itself with the screw 1.

In this particular type of nut unit, the main purpose of the nut-holder is simply to hold the nut in assembly with the inner part 11 and prevent rotation thereof while a screw is being engaged with the nut to secure the outer part or fixture to the inner part.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. A fastening device comprising, in combination, a one-piece nut-holder having a base portion, a plurality of resilient fingers each extending from said base portion first in one direction and then in the opposite direction to provide for substantial expansion and contraction of said fingers, a nut located between said fingers and resting upon said base portion, and means providing a lost motion connection between the nut and the nut-holder whereby the nut may shift laterally in any direction relative to the nut holder.

2. A fastening device comprising, in combination, a nut-holder presenting a plurality of fingers for resilient engagement with a support, a shiftable nut having a notch interlocked with one of said fingers to prevent substantial turning movement of the nut relative to said holder, said notch being larger in area than the cross-sectional area of the finger with which it cooperates and said nut being spaced from said fingers to permit lateral shifting of the nut relative to the holder for alignment with a cooperating screw.

3. A fastening device comprising, in combination, a nut-holder having an apertured base, yieldable fingers extending from said base for securing the nut-holder to a support, a nut having a flange portion seated against the base of the nut-holder and a boss portion extending through the aperture in the base portion and a notch provided in the flange and cooperating with one of the yieldable fingers as and for the purposes illustrated and described.

In testimony whereof, I have signed my name to this specification.

FRED S. CARR.